W. P. POWERS.
GAS REGULATOR.
APPLICATION FILED OCT. 25, 1918.
1,305,743.
Patented June 3, 1919.
2 SHEETS—SHEET 1.
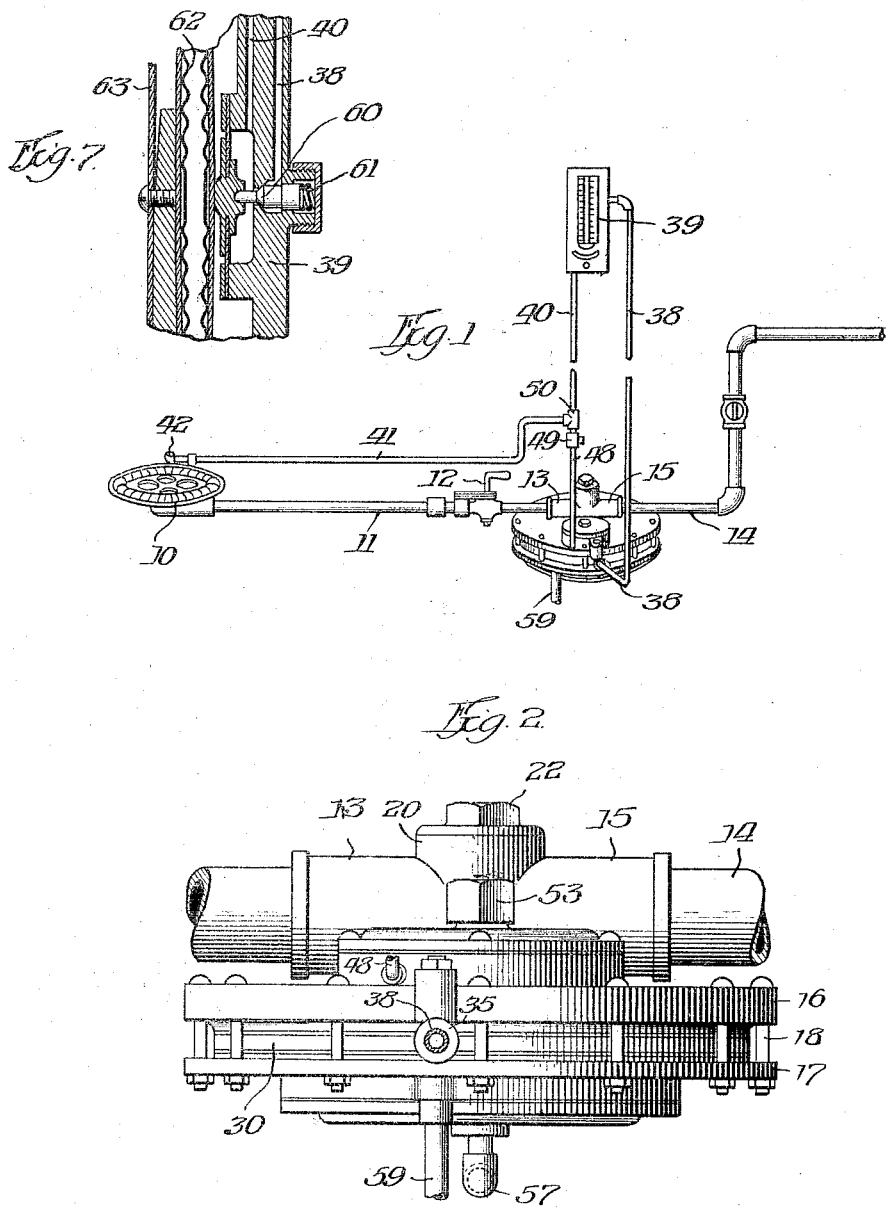

W. P. POWERS.
GAS REGULATOR.
APPLICATION FILED OCT. 25, 1918.
1,305,743.
Patented June 3, 1919.
2 SHEETS—SHEET 2.
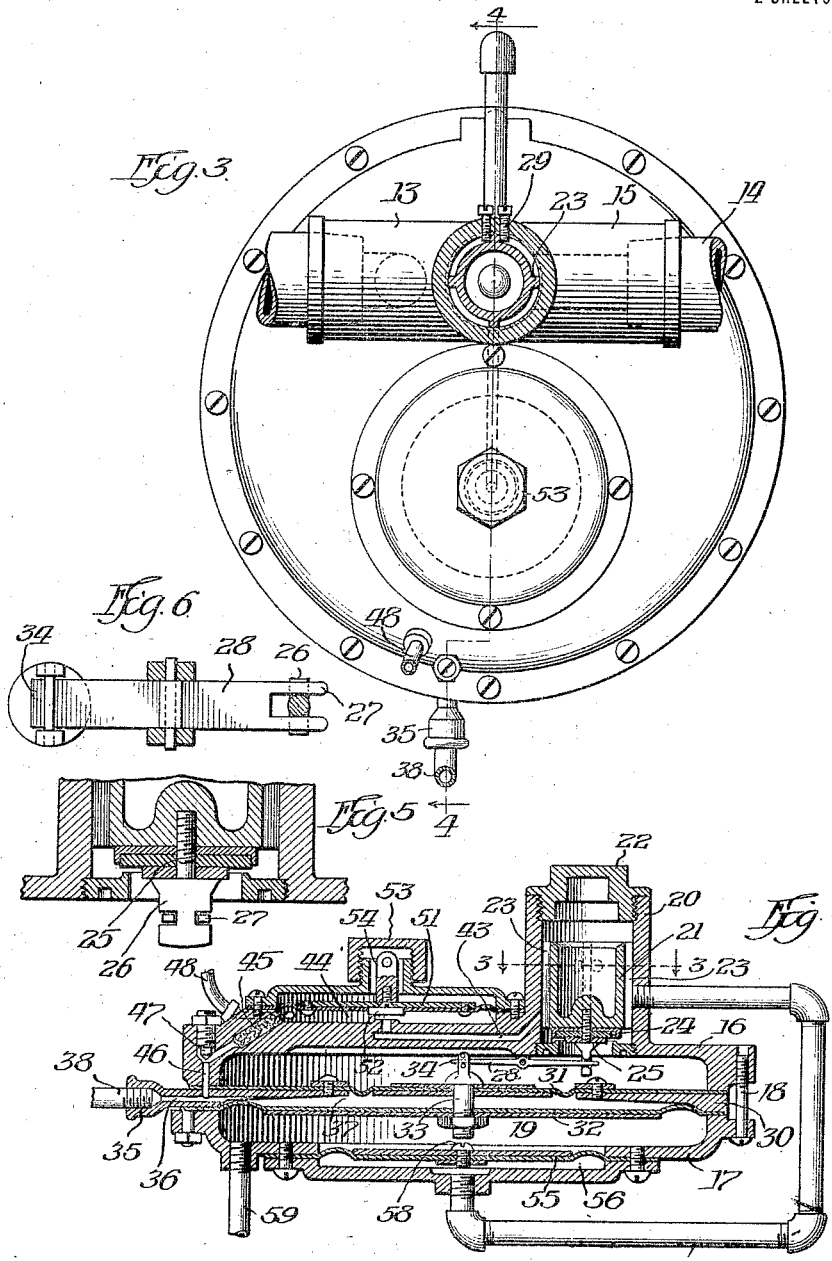

UNITED STATES PATENT OFFICE.

WILLIAM P. POWERS, OF LOS ANGELES, CALIFORNIA.

GAS-REGULATOR.

1,305,743. Specification of Letters Patent. Patented June 3, 1919.

Application filed October 25, 1918. Serial No. 259,652.

*To all whom it may concern:*

Be it known that I, WILLIAM P. POWERS, a citizen of the United States, and resident of Los Angeles, in the county of Los Angeles and State of California, have invented certain new and useful Improvements in Gas-Regulators, of which the following is a specification.

My invention relates to gas regulating and controlling devices and particularly to an improvement on the construction shown in my co-pending application Serial No. 246,199, filed July 22, 1918.

An object of the device herein illustrated is to provide a regulator adapted for automatic operation in residences and other places in which gas is used for heating. The mechanism is, of course, adapted for use in other structures where the quantity of fluid to be supplied is controlled by suitable heat sensitive devices.

Wherever the supply of heating fluid is thermostatically controlled there is in the devices commonly employed a point at which the supply valve is nearly but not entirely closed, the quantity of gas furnished to the burner being insufficient to maintain a steady flame. This results in the formation of a thin, highly explosive mixture resulting in a back-fire through the supply pipe to the mixer; furthermore, the explosion may extinguish the pilot light. I have succeeded in obviating this difficulty by providing such regulating means that the main valve is fully opened and fully closed after an opening or closing movement has begun. To secure the desired result I have employed three diaphragms, all of different areas, and have effected the regulating action by utilizing the gas at its supply pressure. A thermostat acts to control the escape of gas from between two of the diaphragms, a constant pressure of gas on the third diaphragm acting in opposition to the varying pressure between the two diaphragms and serving to positively close the main valve. An advantage in this construction is that no springs are necessary, the valve being moved in both directions by the gas pressure.

In addition I have combined with the apparatus shown an automatic valve adapted upon failure of the supply pressure to close the passage to the valve opening mechanism and to remain in this position until manually opened. However, this does not prevent the passage of gas from the supply to the third diaphragm and the pressure directed thereon will hold the valve closed until operating conditions are normal.

The apparatus also includes other novel features which will be better understood by reference to the accompanying drawings in which;

Figure 1 is a diagrammatic illustration of a gas heating and regulating device constructed in accordance with my invention;

Fig. 2 is a side elevation of the regulating apparatus;

Fig. 3 is a plan view thereof partly in section on the line 3—3 of Fig. 4;

Fig. 4 is a transverse sectional view on the line 4—4 of Fig. 3;

Fig. 5 is an enlarged fragmentary view showing the form of connection between the valve and operating lever;

Fig. 6 is a sectional plan view of the lever, and,

Fig. 7 is a sectional view through a form of thermostat which I prefer to employ.

In the drawings it will be seen that a burner 10, adapted to be associated with any suitable heating device, is connected by means of the pipe 11, and a manually controlled valve 12, to the outlet 13, from the regulator casing. Gas is supplied through a pipe 14, to the inlet 15, of the casing.

The casing is composed of upper and lower halves 16, 17, joined by bolts or screws 18, thus providing a chamber 19. A tubular projection 20, from the upper section 16, of the casing serves as a housing for the main valve 21. This valve controls the passage of gas from the supply to the burner. The interior of the tubular projection is in communication with the supply of gas through the pipe 14. The top of the tubular projection is closed by a threaded plug 22. The valve is provided, as best shown in Fig. 3, with a plurality of side ribs 23, which guide the valve and permit the passage of gas along the sides thereof. The seat 24, is confined against the lower face of the valve member by means of a screw 25, the head 26, of which, as best shown in Fig. 5, is notched to permit of engagement therewith by the bifurcated end 27, of a lever 28, best shown in Fig. 6. Inasmuch as the valve is positively moved to both open and closed positions by the diaphragms, later to be described, a positive connection must be made between the operating lever and the valve. Furthermore, it is necessary at times to remove the valve and this should be accomplished without dismantling the casing. In order to secure this result I provide a connection between the operating lever and the valve, as best shown in Figs. 5 and 6, whereby upon a rotation of the valve through substantially 90°, it may be disconnected from the lever. The result is secured by providing two set-screws 29, best shown in Fig. 3, which are located one at each side of one of the vertical ribs 23. When it is desired to remove the valve one of these screws may be retracted and the valve rotated to such a position that it may be lifted vertically, the flat portion of the head 26, passing freely through the bifurcated end 27, of the lever.

Mounted between the two sections 16, 17, of the casing is a flat ring 30, having a relatively small central opening. This opening is closed by means of a diaphragm 31, secured in a well known manner to the edge of the ring near the central opening. A second diaphragm 32, of considerably greater area is located beneath the first diaphragm, and is held at its periphery by clamping the same between the interposed ring and the lower section 17. A fastening bolt and nut 33, is provided at the center of the two diaphragms, this bolt serving to space apart the two diaphragms and cause movement thereof in unison. The upper portion of the bolt is shaped to provide a connection to the end 34, of the lever 28. A hollow threaded stud 35, is provided at one side of the ring member 30, a passage 36, at the inner end of which communicates with the space 37, between the two diaphragms 31, 32. A pipe 38, is connected into the threaded stud 35, and leads to a thermostat 39, best shown in Fig. 7. The pipe 40, leading from the thermostat communicates through a T with a pipe 41, terminating in a pilot light 42, adjacent to the burner 10.

Gas from the supply side of the main valve is admitted through the small passage 43, into the chamber 44, thence through the screened outlet 45, to a passage 46, which communicates with the passage 36, in the ring. The flow of gas through this passage is limited and controlled by a needle valve 47. A constant supply of gas for the pilot light is furnished through the pipe 48, which communicates with the chamber 44, and leads through a control valve 49, to the T 50, heretofore referred to.

To prevent the possibility of accident following an interruption and subsequent return of the supply of gas, I provide an automatic valve, best shown in Fig. 4, comprising a diaphragm 51, which carries a valve 52, normally overlying the outlet from the passage 43. This diaphragm is freely movable in the chamber 44, and whenever there is pressure in the chamber, the diaphragm is held in raised position, thus permitting the free passage of gas to the diaphragms and pilot light as described. However, upon the interruption of the supply of gas, the diaphragm descends of its own weight and closes the outlet from the passage 43. Subsequent restoration of pressure will not effect the lifting of this diaphragm, which must be done manually by unscrewing the cap 53, and exerting a lifting force on the member 54.

Also located in the casing and occupying the lower portion of the section 17, thereof, is a third diaphragm 55, the space beneath the diaphragm constituting the chamber 56, which is in open communication through the pipe 57, with the gas on the supply side of the burner. In the drawings the connection is shown by means of an exterior pipe which terminates in a space above the main valve 21. However, this pipe may be formed in the casing members if desired. The fastening screw 58, for the diaphragm 55, abuts or is in close proximity to the lower end of the bolt 33, and therefore the force of the gas against the diaphragm will be exerted in an upward direction and through the lever 28, will tend to close the main valve. The space between the diaphragm 55, and diaphragm 32, contains no gas but will be vented through the pipe 59, the vent pipe terminating in the furnace or exteriorly of the residence to provide for the escape of any leakage of gas through the diaphragms.

The thermostatic valve indicated generally by the numeral 39 in Fig. 1, comprises, as best shown in Fig. 7, a valve 60, normally held against its seat by a spring 61, this valve controlling the passage of gas from the conduit 38, to the conduit 40. A thermostatic element 62, in the form of a hollow resilient disk is adapted to contain a volatile liquid which expands or vaporizes on the application of heat. The degree of expansion is controlled by a spring 63, and an adjusting screw (not shown).

The operation of the device is as follows; assuming that the main valve 21, is closed and that the thermostat valve is likewise closed, as occurs when the apartment is insufficiently heated. Upon admitting pressure through the pipe 14, it will by-pass through the pipe 57, to the chamber 56, and act against the diaphragm 55, to hold the valve 21, in closed position. Gas from the same source will also pass through the conduit 43, past the needle valve 47, into the chamber 37, between the two diaphragms. Inasmuch as gas can not escape through the thermostat valve, the pressure in the chamber 37, will be built up as permitted by the needle valve until the pressure acting on the superior area of the diaphragm 32, will over-balance the pressures exerted on the smaller diaphragm 31, and the diaphragm 55, and move the pair of diaphragms downwardly, thus slightly raising the main valve 21. As soon as this valve is raised sufficiently to permit pressure to enter the space above the smaller diaphragm 31, this pressure will act on said smaller diaphragm and will be sufficient to over-balance the opposing pressures and the main valve will immediately be fully opened and gas will be supplied to the burner. It will be understood that the pilot light has been supplied with gas through the pipe 48. Assuming now that the apartment has reached the predetermined temperature and the thermostat valve has been opened. This permits the escape of pressure from between the diaphragms and as soon as a point is reached where the pressure acting on the diaphragm 55, over-balances the pressure on the diaphragm 32, the main valve will begin to close. When it reaches a point near its closed position, the escape of gas to the burner will be restricted and the pressure in the space above the small diaphragm 31, will be rapidly reduced due to the consumption of gas by the burner. The pressure acting on the diaphragm 55, will then act to entirely close the main valve. In other words, whenever the main valve begins to close, the closing action is completed.

Inasmuch as the main valve will be fully opened or fully closed after the opening or closing movements have begun, there is no chance for back-fire. The gas which passes through the thermostat valve will, as explained, be delivered into the pipe leading to the pilot valve.

The exact form and arrangement of parts is not essential and modifications in the construction and arrangement of the valve-controlling diaphragms may be made without departure from the spirit of my invention.

I claim:

1. In a gas regulator, the combination of a casing, a main valve for controlling the supply of gas to a burner, and means controlled by the pressure of gas on the supply side of the valve for fully opening and fully closing said valve after an opening or closing movement has begun, substantially as described.

2. In a gas regulator, the combination of a casing, a main valve for controlling the supply of gas to a burner, a thermostat, and means operable by the passage of gas from the supply side of the valve through the thermostat for fully opening said valve after an opening movement has begun, substantially as described.

3. In a gas regulator, the combination of a casing, a main valve for controlling the supply of gas to a burner, a thermostat, a pair of diaphragms of unequal areas, means providing a passage for gas from the supply side of the burner to the space between said diaphragms, said thermostat serving to control the pressure of gas in the space from between said diaphragms, the diaphragm of lesser area being exposed to the gas on the burner side of the valve, whereby upon the accumulation of pressure in the space between said diaphragms said valve will begin to open and the gas admitted past said valve will act on said diaphragm of lesser area and complete the opening of said valve, substantially as described.

4. In a gas regulator, the combination of a casing, a main valve therein, a pair of diaphragms of unequal areas, the first being of less area than the second, means for admitting gas between said diaphragms, a third diaphragm, means for supplying a constant gas pressure to said third diaphragm, said pressure acting in opposition to the pressure exerted by said second diaphragm, the total areas of the first and third diaphragms being less than that of the second diaphragm, and thermostatic means for releasing the pressure between said diaphragms whereby the force exerted by said second diaphragm is overcome and said valve is completely closed, substantially as described.

5. In a gas regulator, the combination of a casing, a valve controlling the supply of gas to a burner, a pair of diaphragms of unequal areas, means for exerting the force of the gas pressure from the supply side of the valve on both sides of the diaphragm of greatest area and on one side of the diaphragm of lesser area, means for admitting gas from the burner side of the valve to the other side of said diaphragm of lesser area, and a thermostat for controlling the pressure of gas between said diaphragms whereby said valve is completely opened or completely closed after the beginning of an opening or closing movement, substantially as described.

6. In a gas controlling device, the combination of a casing, a main valve for controlling the supply of gas to a burner, means controlled by the pressure of gas on the supply side of the valve for fully opening and fully closing said valve after an opening or closing movement is begun, and an automatic valve associated with said casing, said automatic valve being adapted to suspend the admission of controlling pressure following an interruption in the supply of gas, substantially as described.

7. In a gas regulating device, the combination of a casing, a main valve therein, a pair of diaphragms of unequal areas, a passage being provided for conducting the gas from the supply side of said main valve to the space between said diaphragms, a needle valve for controlling the admission of gas through said passage and an automatic valve located in said passage and adapted to prevent the admission of gas through said passage subsequent to an interruption in the gas supply, substantially as described.

8. In a gas regulating and controlling device, the combination of a casing, a valve for controlling the supply of gas to a burner, a pair of diaphragms of unequal area, means operatively connecting said diaphragms and valve, the space between said diaphragms being open to the gas on the supply side of the burner, a third diaphragm acting in opposition to the pair of diaphragms, said third diaphragm being open at one side to gas from the supply side of the burner, the diaphragm of lesser area being open to the gas on the burner side of said valve when said valve is open, and thermostatic means for controlling the escape of pressure from between said diaphragms, substantially as described.

9. In a gas regulating device, the combination of a casing, a main valve therein, a pair of diaphragms of unequal areas, means for admitting gas from the supply side of the valve to the space between said diaphragms, a third diaphragm having an area intermediate in size between the areas of said pair of diaphragms, means for supplying gas from the supply side of the burner to one side of said third diaphragm, whereby the pressure exerted is opposed to that admitted between said diaphragms, and thermostatic means for controlling the escape of pressure between said diaphragms, substantially as described.

10. In a gas regulating device, the combination of a casing, a main valve therein, a pair of diaphragms of unequal areas, means for admitting gas from the supply side of the burner to the space between said diaphragms, a third diaphragm having an area intermediate the areas of said pair of diaphragms, means for supplying gas from the supply side of the burner to one side of said third diaphragm, whereby the pressure exerted is opposed to that admitted between said diaphragms, thermostatic means for controlling the escape of pressure between said diaphragms, and a needle valve for controlling the supply of gas to the space between said diaphragms, substantially as described.

11. In a gas regulator, the combination of a casing, a main valve therein, a plurality of diaphragms for actuating said valve, a lever connecting said diaphragms to said valve, and means in the connection between said lever and valve for disconnecting the same by a partial rotation of said valve, substantially as described.

12. In a gas regulator, the combination of a casing, a main valve therein, a plurality of diaphragms for actuating said valve, a lever connecting said diaphragms to said valve, means in the connection between said lever and valve for disconnecting the same by a partial rotation of said valve, and means preventing rotation of said valve during normal operation, substantially as described.

13. In a device of the class described, the combination of a casing formed of coöperating sections to provide a chamber, a main valve mounted in said casing, an annular ring located between said sections, a first diaphragm connected to said ring near its internal opening, a second diaphragm connected to said ring near its point of engagement with said casing, whereby diaphragms of unequal areas are provided, means for controllably admitting gas from the supply side of the valve to the space between said diaphragms, a thermostat for controlling the escape of pressure from between said diaphragms, and a third diaphragm acting in opposition to the pressure exerted on said second diaphragm by the gas between said diaphragms, all of said diaphragms being operatively connected to said main valve whereby said valve is completely opened and completely closed after the beginning of the opening or closing movement, substantially as described.

14. In a gas controlling apparatus, the combination of a casing, a main valve therein, a pair of diaphragms, the first being in communication with the gas on the burner side of the main valve and being of less area than the second diaphragm, means for admitting gas pressure between said diaphragms, a thermostat for controlling said pressure, a third diaphragm under constant pressure of gas from the supply side of the valve, said third diaphragm acting in opposition to said second diaphragm, the diaphragms being so proportioned and controlled that the main valve is completely closed after the closing movement is begun, substantially as described.

15. In a gas regulating device, the combination of a casing, a main valve, a pair of diaphragms, means for admitting gas at supply pressure between said diaphragms, thermostatic means for varying said pressure, and a third diaphragm acting under constant pressure of gas from the supply side of the valve, said third diaphragm exerting a constant force tending to close said valve, substantially as described.

Signed at Chicago, Ill., this 21st day of October, 1918.

WILLIAM P. POWERS.

Witness:
T. D. BUTLER.